US008744398B2

(12) United States Patent
Xing

(10) Patent No.: US 8,744,398 B2
(45) Date of Patent: Jun. 3, 2014

(54) TERMINAL, CHIP AND METHOD FOR RECEIVING AN EMERGENCY BROADCAST MESSAGE

(75) Inventor: Xing Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/125,960

(22) PCT Filed: Jul. 16, 2009

(86) PCT No.: PCT/CN2009/072784
§ 371 (c)(1), (2), (4) Date: Apr. 25, 2011

(87) PCT Pub. No.: WO2010/048819
PCT Pub. Date: May 6, 2010

(65) Prior Publication Data

US 2011/0212701 A1 Sep. 1, 2011

(30) Foreign Application Priority Data

Oct. 27, 2008 (CN) .......................... 2008 1 0172537

(51) Int. Cl.
*H04M 11/04* (2006.01)

(52) U.S. Cl.
USPC .......... 455/404.1; 455/3.01; 455/557; 725/33

(58) Field of Classification Search
USPC ....................................................... 455/404.1
See application file for complete search history.

(56) References Cited

U.S. PATENT DOCUMENTS

2004/0266336 A1 12/2004 Patsiokas et al.
2006/0015916 A1* 1/2006 Yun .............................. 725/108
2007/0207727 A1 9/2007 Song et al.
2007/0268883 A1 11/2007 Quelle et al.
2008/0085695 A1* 4/2008 Vare et al. .................. 455/404.1
2009/0061762 A1 3/2009 Patsiokas et al.

FOREIGN PATENT DOCUMENTS

CN 101198086 A 6/2008
CN 101267264 A 9/2008
CN 101272191 A 9/2008
CN 101272567 A 9/2008

(Continued)

OTHER PUBLICATIONS

Supplementary European Search Report in European application number: 09823011.3, mailed on Jul. 11, 2013.

(Continued)

*Primary Examiner* — Vladimir Magloire
(74) *Attorney, Agent, or Firm* — Oppedahl Patent Law Firm LLC

(57) ABSTRACT

A method for receiving an emergency broadcast message comprises the following steps: after receiving multiplex frames, a terminal determines whether there exists an emergency broadcast message according to a frame header of a multiplex frame corresponding to a control channel, and if so, the terminal parses the multiplex frame which corresponds to the control channel and has a multiplex frame identity of 0, to obtain the emergency broadcast message, and displays the obtained emergency broadcast message to a terminal user; while processing the emergency broadcast message, the terminal parses all the multiplex frames, plays mobile telephone TV programs and displays them to the terminal user. To implement the method, a terminal for receiving an emergency broadcast message and a chip for receiving and processing an emergency broadcast message are also disclosed.

11 Claims, 5 Drawing Sheets

(56) References Cited

FOREIGN PATENT DOCUMENTS

| | | | |
|---|---|---|---|
| CN | 101383668 | A | 3/2009 |
| EP | 1816766 | A2 | 8/2007 |
| JP | 2007006442 | A | 1/2007 |
| KR | 20070035871 | A | 4/2007 |
| KR | 20080078444 | A | 8/2008 |

OTHER PUBLICATIONS

International Search Report in international application No. PCT/CN2009/072784, mailed on Sep. 24, 2009.

English Translation of the Written Opinion of the International Search Authority in international application No. PCT/CN2009/072784, mailed on Sep. 24, 2009.

* cited by examiner

TERMINAL, CHIP AND METHOD FOR RECEIVING AN EMERGENCY BROADCAST MESSAGE

CROSS-REFERENCE TO RELATED APPLICATIONS

This patent application is a U.S. national phase application of International Patent Application No. PCT/CN2009/072784, filed Jul. 16, 2009, which claims priority to China Patent Application No. 200810172537.0, filed Oct. 27, 2008, each of which is hereby incorporated by reference herein in its entirety.

TECHNICAL FIELD

The present disclosure relates to the field of mobile multimedia broadcast, and in particular, to a terminal, chip and method for receiving an emergency broadcast message.

BACKGROUND

Digital mobile multimedia broadcast technologies and related standards have been developed rapidly in recent years, such as Digital Video Broadcast Handheld (DVB-H for short) in Europe, Media Forward Link Only (MediaFLO for short) in America, and BroadCast and MultiCast Services (BCMCS for short) based on mobile cellular, and so on. A digital mobile multimedia broadcast network provides various services for terminal users, such as advertisement, weather forecast, news, sports show, variety show, multimedia broadcasting play, movie and other programs, and the users can select the programs provided by a mobile multimedia player according to their preferences.

In short, the so-called mobile telephone TV service refers to a service which enables a user to watch TV programs via a mobile telephone terminal for mobile communication. As an emerging service, a mobile telephone TV is advantaged in portability, mobility and privacy compared to a conventional television that is placed in a living room for the share of the whole family. With the popularization of mobile data service and the expansion of mobile telephone video function, the mobile telephone TV has gradually stepped into people's life. With the improvement of people's living standard, consumption demands of people become more diversified and fashionable, and watching TV programs on a mobile telephone has become a fashion and will become a life-enjoying way of people.

From the point of the development of broadcast TV service, the conventional broadcast TV technology has been developed rapidly from simulation technology to digital technology, the TV signal receiver has also been developed from a common desktop TV to diversified terminals such as mobile TV, vehicle-mounted TV and handheld TV; from the point of the development trend of mobile communications, it becomes possible to watch TV programs via a mobile telephone terminal as the data transmission capacity of a mobile communication network has been greatly improved and the terminal manufacturing technology is being perfected constantly. The technical progress in these two aspects opens a path for receiving high-quality video programs via a mobile telephone terminal, thus the rigid boundary between the two industries begins to disappear, and as a consequence, a new service mode of mobile telephone TV is developed.

Emergency broadcast, which is a way of notifying the public of emergencies via a broadcast communication system, provides a rapid and efficient way of notice in the cases of emergencies such as natural disaster, accident, public health and social security, or in the cases in which heavy casualties, property loss, ecological environment destruction, serious social harm and threat to public security are brought about or may be brought about. As more and more attention is paid to all kinds of emergencies in the country and various public emergency plans are proposed, as a broadcast technology with a large number of online users, it is extremely necessary to provide an emergency broadcast service. The mobile telephone terminal capable of receiving emergency broadcast messages can receive the emergency broadcast messages sent from an emergency broadcast system.

FIG. 1 is a structure diagram of a mobile multimedia broadcast channel frame, as shown in FIG. 1, a plurality of multiplex frames constitute a broadcast channel frame, and each multiplex frame consists of a multiplex frame header, a multiplex payload and a filling part.

For example, if it is determined that 1 second is a multiplex period, which is divided into 40 time slots, 25 ms is a multiplex unit. Logical mapping of multiplex frames and time slots is determined by system configuration.

One multiplex frame corresponds to one control logical channel or service logical channel. A multiplex frame identity MF_ID, which is ranged from 0 to 39, with the largest number of 39, is distributed to each multiplex frame, wherein the multiplex frame with MF_ID=0, which is mapped to a control logical channel, is used for transmitting system control information, and the multiplex frame with an MF_ID not being 0, which is mapped to a service logical channel, is used for transmitting service information.

As shown in FIG. 2, the multiplex frame with a multiplex frame identity of 0 is used for bearing control information, the multiplex frame payload in the multiplex frame includes a plurality of control information tables, and each multiplex sub-frame consists of one control information table. In the current mobile multimedia broadcast specification, an emergency broadcast service is placed in the control information table with a table identity of 0x10, in the control information multiplex frame.

As shown in FIG. 3, there is an 'emergency broadcast flag' in the multiplex frame header, the multiplex frame with a multiplex frame identity of 0 carries an emergency broadcast when the flag is not 0.

In existing technologies, if an emergency broadcast message receiving chip is installed in a mobile telephone, the emergency broadcast message receiving chip can be started to receive an emergency broadcast message if the mobile telephone is provided with a mobile telephone TV application. The user can receive an emergency broadcast message only after entering the mobile telephone TV application; the user cannot receive an emergency broadcast message when not entering the mobile telephone TV application. If there is not a mobile telephone TV application in a mobile telephone, then the mobile telephone cannot receive an emergency broadcast message. When there is a mobile telephone TV application in a mobile telephone and the user enters the mobile telephone TV application, the mobile telephone performs an uninterrupted detection to determine whether there is an emergency broadcast message, and displays the detected emergency broadcast message to the user when detecting an emergency broadcast message.

Existing technologies have the following disadvantages:

1. the mobile telephone terminal without a mobile telephone TV application cannot receive an emergency broadcast message;

2. the mobile telephone terminal cannot notify the user of an emergency broadcast message timely in an effective period of time, thus failing to perfectly achieve the purpose of providing a rapid and effective way of notice by the emergency broadcast;

3. the mobile telephone terminal consumes a considerable amount of power as it detects emergency broadcast messages uninterruptedly.

Therefore, it is necessary to provide a rational and convenient method for a user to receive an emergency broadcast message when the mobile telephone is powered on.

SUMMARY

The technical problem that the present disclosure solves is to provide a terminal, chip and method for receiving an emergency broadcast message, to guarantee that a powered-on terminal can receive an emergency broadcast message in any case.

In order to solve the above problem, the present disclosure discloses a terminal for receiving an emergency broadcast message, which comprises a display module, a control module, and an emergency broadcast message processing module and a mobile telephone TV module which are connected with the control module respectively; both the emergency broadcast message processing module and the mobile telephone TV module are connected with the display module, wherein the control module is used for sending all multiplex frames received by the terminal to the mobile telephone TV module, and sending a multiplex frame corresponding to a control channel to the emergency broadcast message processing module;

the emergency broadcast message processing module is used for parsing the multiplex frame if it determines that there exists an emergency broadcast message in the multiplex frame corresponding to the control channel, so as to obtain the emergency broadcast message, and display the obtained emergency broadcast message to a terminal user via the display module; and the mobile telephone TV module is used for parsing the multiplex frames and playing mobile telephone TV programs.

Further, in the terminal, the emergency broadcast message processing module may further comprise a control unit, and a parsing and comparing unit which are connected with each other, wherein the control unit may be used for receiving the multiplex frame corresponding to the control channel periodically and sending the multiplex frame to the parsing and comparing unit;

the parsing and comparing unit may be used for parsing a frame header of the received multiplex frame corresponding to the control channel, and parsing the multiplex frame corresponding to the control channel if it determines that there exists an emergency broadcast message in the multiplex frame corresponding to the control channel, so as to obtain the emergency broadcast message, and send the obtained emergency broadcast message to the display module.

Further, the parsing and comparing unit may be used for, if it determines that there exists an emergency broadcast message in the multiplex frame corresponding to the control channel, comparing the emergency broadcast message with that received last time, and parsing the multiplex frame corresponding to the control channel only when the two emergency broadcast messages are different.

The parsing and comparing unit may not parse the multiplex frame corresponding to the control channel if it determines that no emergency broadcast message exists in the multiplex frame corresponding to the control channel.

The present disclosure also discloses a chip for receiving and processing an emergency broadcast message, which comprises a control unit, and a parsing and comparing unit, wherein the control unit is used for receiving a multiplex frame corresponding to a control channel periodically and sending the multiplex frame to the parsing and comparing unit;

the parsing and comparing unit is used for parsing a frame header of the received multiplex frame, and parsing the multiplex frame if it determines that there exists an emergency broadcast message in the multiplex frame, so as to obtain the emergency broadcast message, and output the obtained emergency broadcast message.

Further, in the chip, the parsing and comparing unit may be used for, if it determines that there exists an emergency broadcast message in the multiplex frame corresponding to the control channel, comparing the emergency broadcast message with that received last time, and parsing the multiplex frame only when the two emergency broadcast messages are different.

The present disclosure also discloses a method for receiving an emergency broadcast message, which comprises:

after receiving multiplex frames, a terminal determines whether there exists an emergency broadcast message according to a frame header of a multiplex frame corresponding to a control channel, and if so, the terminal parses the multiplex frame having a multiplex frame identifier of 0 to obtain the emergency broadcast message and display the obtained emergency broadcast message to a terminal user;

the terminal parses all the multiplex frames, plays mobile telephone TV programs and displays them to the terminal user while processing the emergency broadcast messages.

Further, in the method, the terminal may periodically determine whether there exists an emergency broadcast message in the multiplex frame corresponding to the control channel, and if so, the terminal may parse the multiplex frame to obtain the emergency broadcast message and display the obtained emergency broadcast message to the terminal user.

Wherein after determining that there exists an emergency broadcast message in the multiplex frame corresponding to the control channel, the terminal may further compare the emergency broadcast message with that received last time, and parse the multiplex frame only when the two emergency broadcast messages are different.

The terminal may not parse the multiplex frame after determining that no emergency broadcast message exists in the multiplex frame corresponding to the control channel.

The present disclosure enables an emergency broadcast message to be received even if the mobile telephone TV module of the terminal is turned off or not started, and enables an emergency broadcast message to be periodically detected and received when the mobile telephone is powered on; thus emergency broadcast messages can be received timely and effectively while power is saved, thereby further embodying and achieving the purpose of providing a rapid and efficient way of notice by emergency broadcast.

DETAILED DESCRIPTION

The main conception of the present disclosure lies in dividing a mobile telephone TV application module in an existing mobile terminal into two separate modules, which are an emergency broadcast message processing module and a mobile telephone TV program receiving and playing module (hereinafter referred to as a mobile telephone TV module), wherein the emergency broadcast message processing functional module is periodically started by starting a timer during the startup process of a terminal, while the mobile telephone TV module is started by a terminal user at any time as required, in this way, after the terminal is started, the latest emergency broadcast message can be received and displayed no matter whether the mobile telephone TV module is started.

The technical solution of the present disclosure is further described in detail below in combination with embodiments and accompanying drawings.

Figure 1:
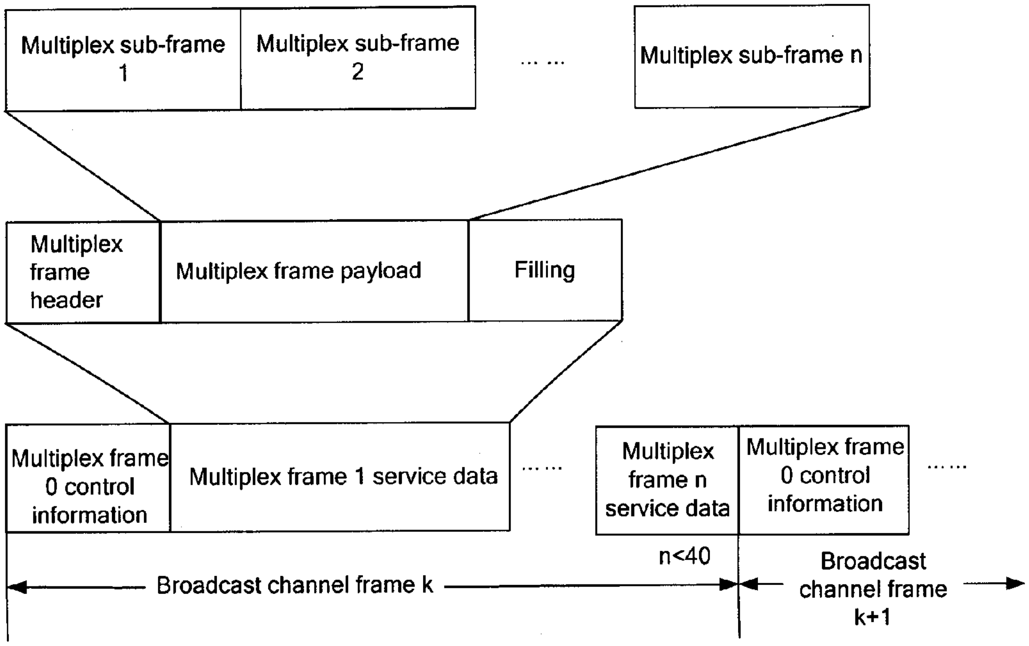
FIG. 1 is a structure diagram of a mobile multimedia broadcast channel frame.
Figure 2:
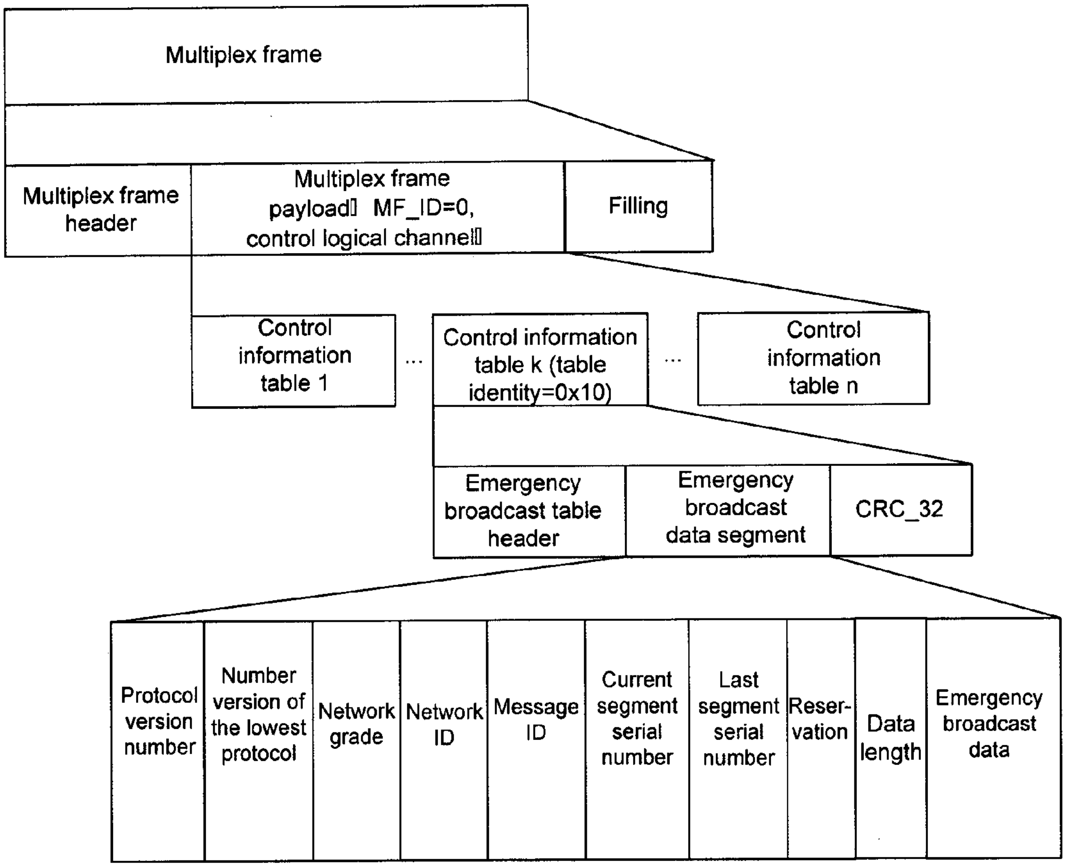
FIG. 2 is a schematic diagram of the format of an emergency broadcast date segment of a control information multiplex frame.
Figure 3:
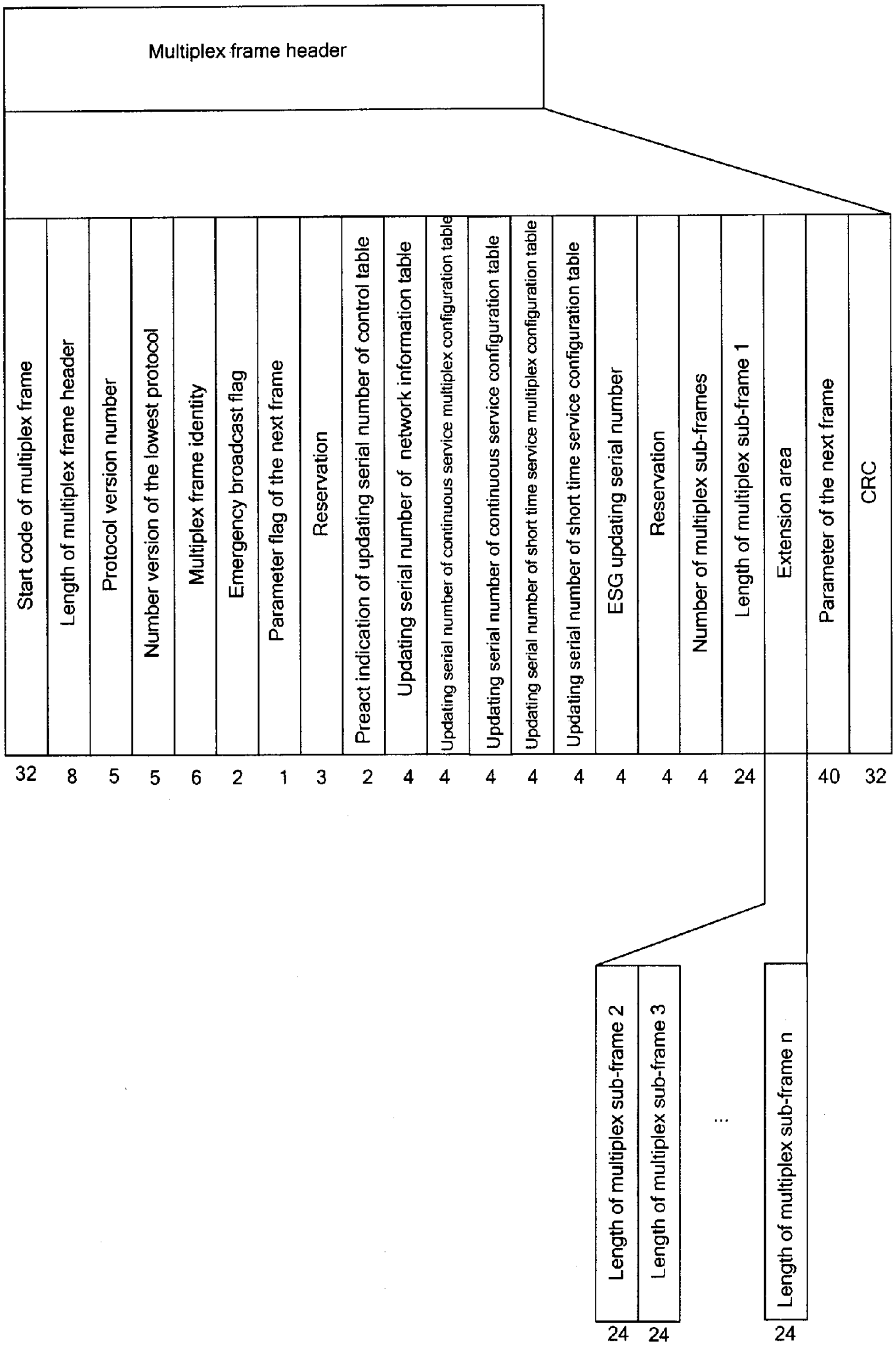
FIG. 3 is a structure diagram of the frame header of a mobile multimedia broadcast multiplex frame.
Figure 4:
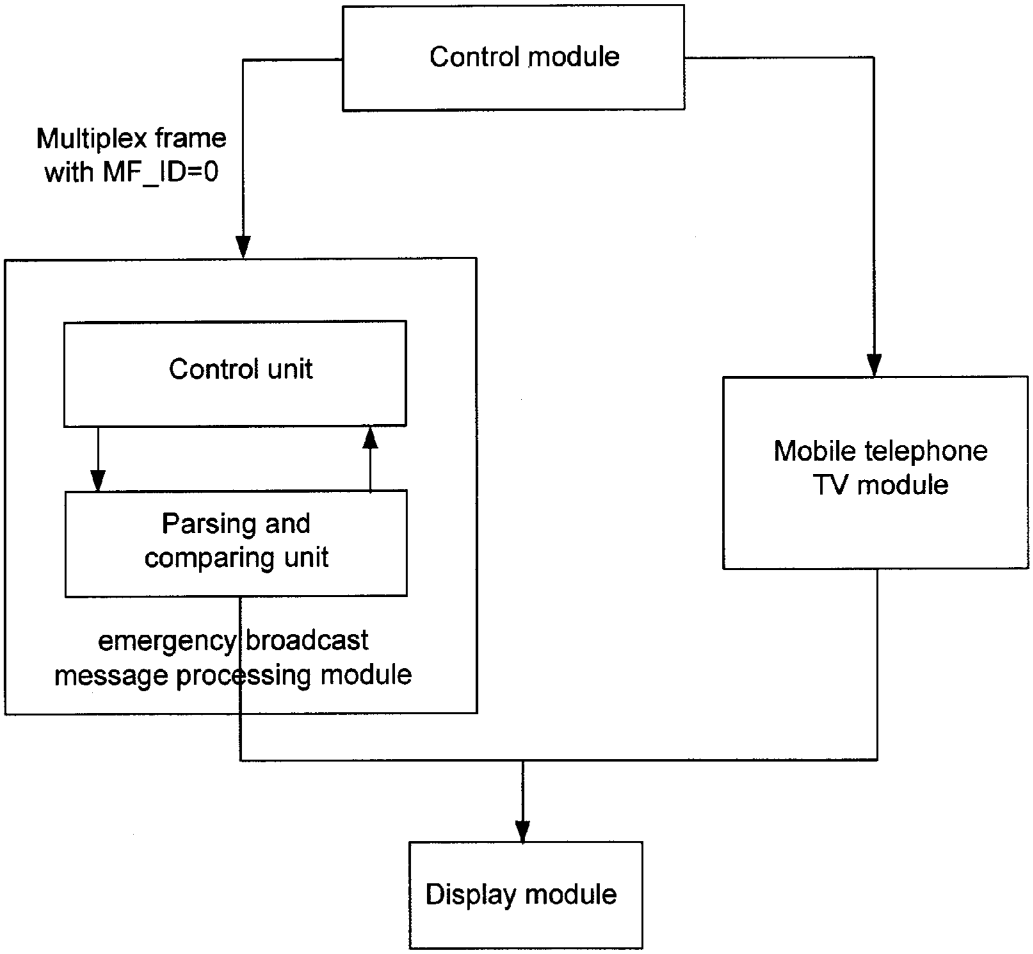
FIG. 4 is a schematic structure diagram of a terminal according to an embodiment of the present disclosure.

A mobile terminal, as shown in FIG. 4, comprises a control module, an emergency broadcast message processing module and a mobile telephone TV module which are connected with the control module respectively, and a display module connected with the emergency broadcast message processing module and the mobile telephone TV module, wherein the emergency broadcast message processing module further comprises a control unit, and a parsing and comparing unit that are connected in turn. The function of each module is described in detail below.

The control module is used for receiving multiplex frames, sending all the multiplex frames to the mobile telephone TV module, and sending a multiplex frame corresponding to a control channel (that is, multiplex frame with MF_ID=0) to the emergency broadcast message processing module.

The mobile telephone TV module is used for parsing multimedia multiplex frames and playing mobile telephone TV programs.

The display module is used for displaying the mobile telephone TV programs output by the mobile telephone TV module or the emergency broadcast message output by the emergency broadcast message processing module on a terminal interface.

The emergency broadcast message processing module is used for parsing the frame header of the multiplex frame with MF_ID=0, determining whether there exists an emergency broadcast message in the multiplex frame with MF_ID=0, and if so, the emergency broadcast message processing module parses the multimedia multiplex frame to obtain the emergency broadcast message and display the obtained emergency broadcast message to the terminal user, in this embodiment, the emergency broadcast message processing module is started during the startup process of the terminal and turned off during the turn-off process of the terminal, wherein the control unit is used for periodically initiating the emergency broadcast message processing module, and outputting the multiplex frame with MF_ID=0 to the parsing and comparing unit when the emergency broadcast message processing module is started; in this embodiment, the control unit may further periodically start the emergency broadcast message processing module via a timer;

the parsing and comparing unit is used for parsing the multiplex frame output by the control unit, parsing the frame header of the multiplex frame, extracting an 'emergency broadcast flag' from the frame header, and comparing the extracted flag with a locally stored emergency broadcast flag variable; if the extracted flag is not equal to the locally stored emergency broadcast flag variable, it is indicated that an emergency broadcast message exists in the multiplex frame with MF_ID=0, then the parsing and comparing unit parses out an emergency broadcast message with a table identity of 0x10 from the multiplex frame, assigns the extracted flag to the locally stored emergency broadcast flag variable and outputs the parsed emergency broadcast message to the display module; and if the current emergency broadcast flag is equal to the locally stored emergency broadcast flag variable, then the parsing and comparing unit notifies the control unit to turn off the emergency broadcast message processing module.

In other embodiments, the terminal may adopt an independent chip for receiving and processing an emergency broadcast message to realize the function of the emergency broadcast message processing module, wherein the chip for receiving and processing an emergency broadcast message comprises a control unit, and a parsing and comparing unit.

The control unit is used for periodically receiving the multiplex frame corresponding to the control channel (multiplex frame with MF_ID=0) and sending the multiplex frame to the parsing and comparing unit.

The parsing and comparing unit is used for parsing the frame header of the received multiplex frame, and further used for, if it determines that an emergency broadcast message exists in the multiplex frame, comparing the emergency broadcast message with that received last time, and parsing the multiplex frame if the two emergency broadcast messages are different, so as to obtain the emergency broadcast message and output the emergency broadcast message to an external display device (such as the display module of a mobile terminal).

Figure 5:
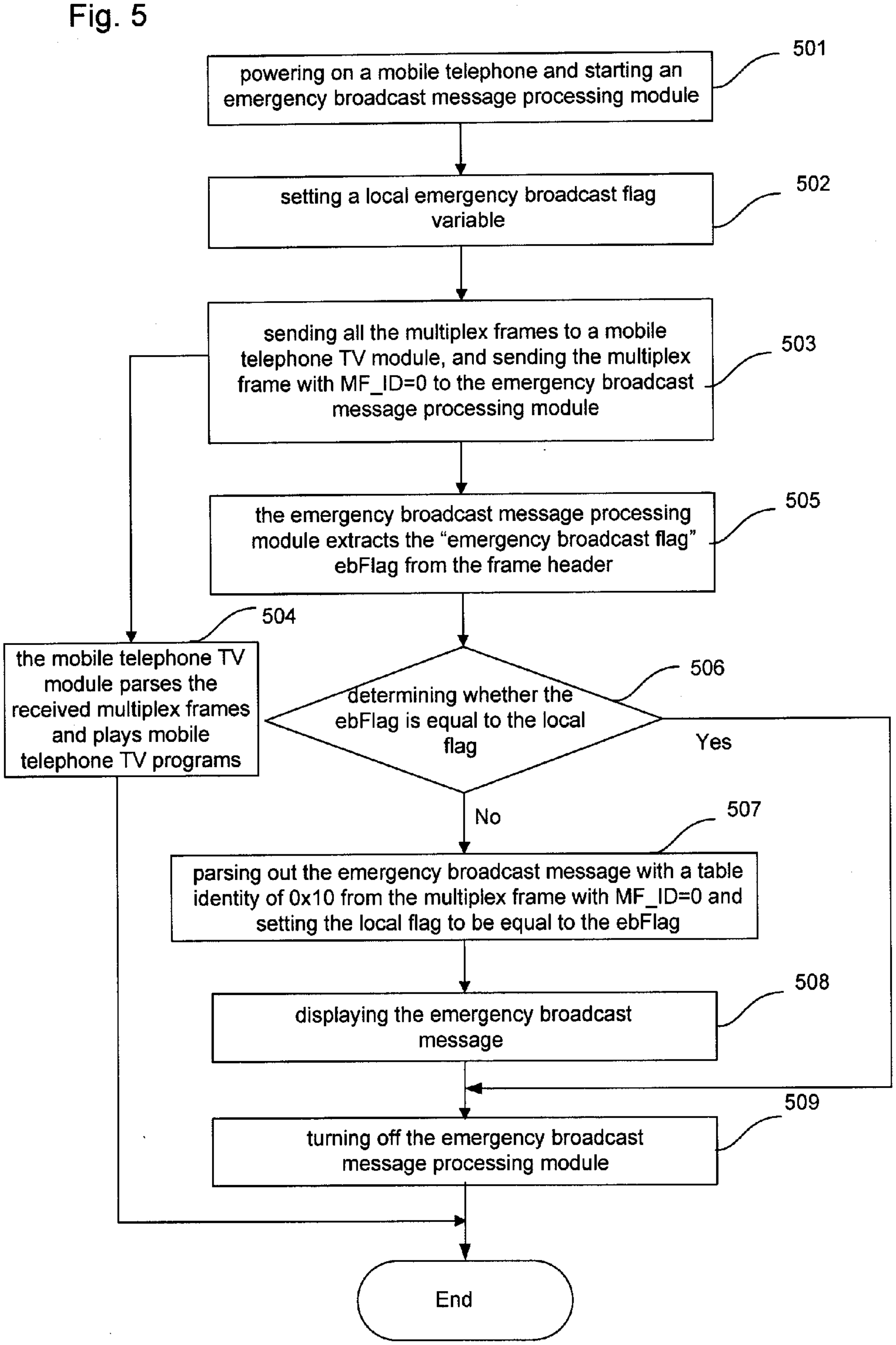
FIG. 5 is a flow chart illustrating that an emergency broadcast message is received by the terminal illustrated in FIG. 4.

The emergency broadcast message receiving process of the terminal is described below, as shown in FIG. 5, the process includes the following steps:

501: powering on a terminal and starting an emergency broadcast message processing module;

502: setting a local emergency broadcast variable flag, in this embodiment, the initial value of the flag is set to be 0;

503: receiving multimedia multiplex frames, sending all the multiplex frames to a mobile telephone TV module, and sending the multiplex frame corresponding to the control channel (that is, multiplex frame with MF_ID=0) to the emergency broadcast message processing module;

504: parsing the received multiplex frames, playing mobile telephone TV programs, and ending this flow by the mobile telephone TV module;

505: parsing the frame header of the multiplex frame with MF_ID=0 and extracting the 'emergency broadcast flag' from the frame header by the emergency broadcast message processing module, in this embodiment, the 'emergency broadcast flag' is represented by ebFlag;

506: determining whether the ebFlag is equal to the local flag, if so, turn to step 509, otherwise, turn to step 507;

in this step, the determination on whether the ebFlag is equal to the local flag is to guarantee that no identical emergency broadcast messages are displayed to the user;

507: parsing out the emergency broadcast message with a table identity of 0x10 from the multiplex frame with MF_ID=0 and setting the local flag to be equal to the ebFlag;

508: displaying the emergency broadcast message to the user;

509: turning off the emergency broadcast message processing module.

It can be seen from the above embodiments that the technical solution of the present disclosure enables an emergency broadcast message to be received even if the mobile telephone TV module of the terminal is turned off or not started by controlling the separation of the emergency broadcast message processing part and the general function of receiving and playing mobile telephone TV programs; in addition, as the emergency broadcast message processing module is started at regular time, that is, it is guaranteed that an emergency broadcast message is detected and received periodically when the mobile telephone is powered on, thus the emergency broadcast message can be received timely and effectively while the purpose of saving power is realized.

Of course, the present disclosure may have many other embodiments, various corresponding modifications and variations can be devised by those skilled in the art, without departing from the spirit and the essence of the present disclosure, but all these corresponding modifications and variations belong to the protection scope of the appended claims of the present disclosure.

The invention claimed is:

1. A mobile terminal for receiving an emergency broadcast message, comprising a display module, a control module, an emergency broadcast message processing module which is connected to the display module and the control module, and a mobile telephone television (TV) module which is connected to the display module and the control module, wherein the control module is configured to send all multiplex frames received by the mobile terminal to the mobile telephone TV module, and send a multiplex frame corresponding to a control channel to the emergency broadcast message processing module, wherein the mobile telephone TV module is configured to parse the multiplex frames and play mobile telephone TV programs when being turned on, wherein the emergency broadcast message processing module, which functions independently of the mobile telephone TV module and is periodically started, is configured to parse the multiplex frame corresponding to the control channel when determining that there is an emergency broadcast message in the multiplex frame corresponding to the control channel, so as to obtain the emergency broadcast message, and display the obtained emergency broadcast message to a mobile terminal user via the display module, and wherein even when the mobile telephone TV module is turned off, causing the mobile telephone TV programs not to be played, the mobile terminal is still able to display the emergency broadcast message, which is obtained by the emergency broadcast message processing module, via the display module.

2. The mobile terminal according to claim 1, wherein the emergency broadcast message processing module further comprises a control unit, and a parsing and comparing unit which are connected to the control unit, wherein the control unit is configured to receive the multiplex frame corresponding to the control channel periodically and send the multiplex frame to the parsing and comparing unit, and wherein the parsing and comparing unit is configured to parse a frame header of the received multiplex frame corresponding to the control channel, and parse the multiplex frame corresponding to the control channel when determining that there is an emergency broadcast message in the multiplex frame corresponding to the control channel, so as to obtain the emergency broadcast message, and send the obtained emergency broadcast message to the display module.

3. The mobile terminal according to claim 2, wherein the parsing and comparing unit is configured, when determining that there is an emergency broadcast message in the multiplex frame corresponding to the control channel, to compare the emergency broadcast message with that received last time, and parse the multiplex frame corresponding to the control channel only when the two emergency broadcast messages are different.

4. The mobile terminal according to claim 3, wherein the parsing and comparing unit does not parse the multiplex frame corresponding to the control channel when determining that no emergency broadcast message exists in the multiplex frame corresponding to the control channel.

5. The mobile terminal according to claim 2, wherein the parsing and comparing unit does not parse the multiplex frame corresponding to the control channel when determining that no emergency broadcast message exists in the multiplex frame corresponding to the control channel.

6. The mobile terminal according to claim 1, wherein the emergency broadcast message processing module is in a form of a single chip.

7. A chip dedicated to receiving and processing an emergency broadcast message, comprising a control unit, and a parsing and comparing unit, wherein the control unit is configured to receive a multiplex frame corresponding to a control channel periodically and sending the multiplex frame to the parsing and comparing unit, wherein the parsing and comparing unit is configured to parse a frame header of the received multiplex frame corresponding to the control channel, and parse the multiplex frame corresponding to the control channel when determining that there is an emergency broadcast message in the multiplex frame corresponding to the control channel, so as to obtain the emergency broadcast message, and output the obtained emergency broadcast message, and wherein the chip is located in a mobile terminal, which also comprises a mobile telephone TV module configured to parse the multiplex frames and play mobile telephone TV programs when being turned on, and the chip functions independently of the mobile telephone TV module, such that even when the mobile telephone TV module is turned off, causing the mobile telephone TV programs not to be played, the mobile terminal is still able to display the emergency broadcast message, which is obtained by the emergency broadcast message processing module.

8. The chip according to claim 7, wherein the parsing and comparing unit is configured, when determining that there is an emergency broadcast message in the multiplex frame corresponding to the control channel, to compare the emergency broadcast message with that received last time, and parse the multiplex frame corresponding to the control channel only when the two emergency broadcast messages are different.

9. A method for receiving an emergency broadcast message at a mobile terminal, comprising:

at a mobile telephone TV module in the mobile terminal, receiving and paring multiple frames and playing telephone TV programs when being turned on;

at a chip dedicated to receiving and processing an emergency broadcast message in the mobile terminal, regardless of whether the mobile telephone TV module is turned off or not, periodically receiving the multiplex frames, determining whether there exists an emergency broadcast message according to a frame header of a multiplex frame corresponding to a control channel, and if so, parsing the multiplex frame which corresponds to the control channel and has a multiplex frame identity of 0 to obtain the emergency broadcast message and display the obtained emergency broadcast message to a mobile terminal user, such that even when the mobile telephone TV module is turned off, causing the mobile telephone TV programs not to be played, the mobile terminal is still able to display the emergency broadcast message, which is obtained by the emergency broadcast message processing module.

10. The method according to claim 9, further comprising:

after determining that there exists an emergency broadcast message in the multiplex frame corresponding to the control channel, comparing the emergency broadcast message with that received last time, wherein the multiplex frame corresponding to the control channel is parsed only when the two emergency broadcast messages are different.

11. The method according to claim 9, wherein the multiplex frame corresponding to the control channel is not parsed after determining that no emergency broadcast message exists in the multiplex frame corresponding to the control channel.

* * * * *